US010762520B2

(12) United States Patent
Ericson

(10) Patent No.: US 10,762,520 B2
(45) Date of Patent: Sep. 1, 2020

(54) ENCRYPTION OF DIGITAL INCENTIVE TOKENS WITHIN IMAGES

(71) Applicant: PayPal, Inc., San Jose, CA (US)

(72) Inventor: Braden Christopher Ericson, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 77 days.

(21) Appl. No.: 15/721,437

(22) Filed: Sep. 29, 2017

(65) Prior Publication Data
US 2018/0349938 A1    Dec. 6, 2018

Related U.S. Application Data

(63) Continuation-in-part of application No. 15/609,941, filed on May 31, 2017.

(51) Int. Cl.
| H04L 9/32 | (2006.01) |
| G06Q 30/02 | (2012.01) |
| H04L 29/06 | (2006.01) |
| H04L 9/08 | (2006.01) |
| G09C 5/00 | (2006.01) |

(52) U.S. Cl.
CPC ........... *G06Q 30/0225* (2013.01); *G09C 5/00* (2013.01); *H04L 9/0822* (2013.01); *H04L 9/0825* (2013.01); *H04L 63/0236* (2013.01); *H04L 63/061* (2013.01); *H04L 63/0807* (2013.01); *H04L 63/123* (2013.01); *G06Q 30/0235* (2013.01); *G06Q 2220/00* (2013.01)

(58) Field of Classification Search
CPC ........... G06Q 30/0225; G06Q 30/0235; H04L 9/0822; H04L 63/0236; H04L 63/061; H04L 63/0807

USPC ......................................................... 713/171
See application file for complete search history.

(56) References Cited

U.S. PATENT DOCUMENTS

| 2001/0037467 A1 | 11/2001 | O'Toole, Jr. et al. |
| 2002/0116271 A1 | 8/2002 | Mankoff |

(Continued)

OTHER PUBLICATIONS

Hui Gao; A Survey of Incentive Mechanisms; for Participatory Sensing; IEEE Communication Surveys & Tutorials, vol. 17, No. 2, Second Quarter 2015. p. 918-943 (Year: 2015).*

(Continued)

*Primary Examiner* — Monjur Rahim
(74) *Attorney, Agent, or Firm* — Haynes and Boone LLP

(57) ABSTRACT

Embedding of digital incentive tokens within a digital image can occur cryptographically using a public key in some embodiments. An encrypted digital incentive token may be embedded within a digital image, including a variety of encrypted information. The digital image with the embedded digital incentive token may be sent to users via delivery mechanisms such as direct webpage embedding, email, text message, and social media sharing. An image recipient may be able to view the image and also take additional action including gaining access to the embedded digital incentive token. Digital incentive tokens can be embedded by altering image metadata so that the image itself is not changed in some embodiments, but data associated with the image is changed to identify the token. Pixel data can be altered to reflect a token for an image. Digital incentive tokens can also be tracked through different platforms to determine usage.

20 Claims, 5 Drawing Sheets

(56) References Cited

U.S. PATENT DOCUMENTS

| | | | |
|---|---|---|---|
| 2002/0169892 A1* | 11/2002 | Miyaoku | G06F 16/955 709/246 |
| 2002/0178060 A1 | 11/2002 | Sheehan | |
| 2003/0014363 A1* | 1/2003 | Sethi | G06Q 20/06 705/44 |
| 2003/0159046 A1 | 8/2003 | Choi et al. | |
| 2003/0163787 A1* | 8/2003 | Hay | G06Q 20/367 715/248 |
| 2006/0061088 A1 | 3/2006 | Harrington et al. | |
| 2008/0262928 A1* | 10/2008 | Michaelis | G06Q 30/02 705/14.26 |
| 2009/0164323 A1 | 6/2009 | Byrne | |
| 2009/0194591 A1 | 8/2009 | Gobburu et al. | |
| 2010/0076834 A1 | 3/2010 | Sugaya et al. | |
| 2010/0121766 A1 | 5/2010 | Sugaya | |
| 2011/0004525 A2 | 1/2011 | Byrne | |
| 2011/0016014 A1 | 1/2011 | Tonnison et al. | |
| 2011/0208575 A1 | 8/2011 | Bansal et al. | |
| 2011/0313833 A1 | 12/2011 | Graepel et al. | |
| 2012/0016726 A1* | 1/2012 | Mosites | G06Q 20/387 705/14.12 |
| 2012/0029998 A1 | 2/2012 | Aversano et al. | |
| 2012/0150592 A1 | 6/2012 | Govrik et al. | |
| 2012/0226616 A1* | 9/2012 | Amar | H04L 9/0643 705/50 |
| 2012/0303429 A1 | 11/2012 | Nolledo et al. | |
| 2013/0073366 A1 | 3/2013 | Heath | |
| 2013/0085835 A1 | 4/2013 | Horowitz | |
| 2013/0282455 A1 | 10/2013 | Houseworth et al. | |
| 2013/0325619 A1 | 12/2013 | Lile | |
| 2013/0339167 A1 | 12/2013 | Taylor et al. | |
| 2014/0006116 A1* | 1/2014 | Ren | G06Q 30/0207 705/14.3 |
| 2014/0303991 A1 | 10/2014 | Frank | |
| 2015/0019441 A1 | 1/2015 | Brown et al. | |
| 2015/0032627 A1* | 1/2015 | Dill | G06Q 20/385 705/44 |
| 2015/0193805 A1* | 7/2015 | Filipiak | G06Q 30/0226 715/202 |
| 2015/0199689 A1* | 7/2015 | Kumnick | G06Q 20/3674 705/67 |
| 2015/0310478 A1 | 10/2015 | Bakker | |
| 2016/0072800 A1* | 3/2016 | Soon-Shiong | H04L 63/0861 726/7 |
| 2016/0086221 A1 | 3/2016 | Weinblatt | |
| 2016/0132868 A1 | 5/2016 | Butcher et al. | |

OTHER PUBLICATIONS

Unknown "Adding coupon codes to your website the how and the why?" [Online] Ecommerce Guide [retrieved on Sep. 26, 2017]. Retrieved from the Internet: <URL: https://ecommerceguide.com/guides/coupons/>, Jan. 17, 2016.

Moorman, Christine "Why You Should Build a Digital Marketing Organization" [Online] Forbes [retrieved on Sep. 26, 2017]. Retrieved from the Internet: <URL: https://www.forbes.com/sites/christinemoorman/2017/08/29/why-you-should-build-a-digital-marketing-organization/#627940313024>, Aug. 29, 2017.

* cited by examiner

ENCRYPTION OF DIGITAL INCENTIVE TOKENS WITHIN IMAGES

RELATED APPLICATIONS

This application is a continuation-in-part of, and claims the benefit of, U.S. patent application Ser. No. 15/609,941, filed May 31, 2017, titled "Digital Encryption of Tokens Within Images," the contents of which are herein incorporated by reference in their entirety.

TECHNICAL FIELD

This disclosure includes techniques relating to the embedding of digital tokens within digital images.

BACKGROUND

Digital image files typically use a certain amount of data to store a picture. Images may include stored information usable to render picture using a red/green/blue (RGB) value for each pixel within the image, for example.

Images are also frequently transferred on the Internet. Users may receive images via email, web pages, or other mechanisms.

Typically, however, when an Internet user receives an image, no additional information is conveyed. The recipient of an image is able to view the image, but generally only is able to appreciate artistry, text, and/or a real-world picture that is contained in the image.

DETAILED DESCRIPTION

Figure 1:
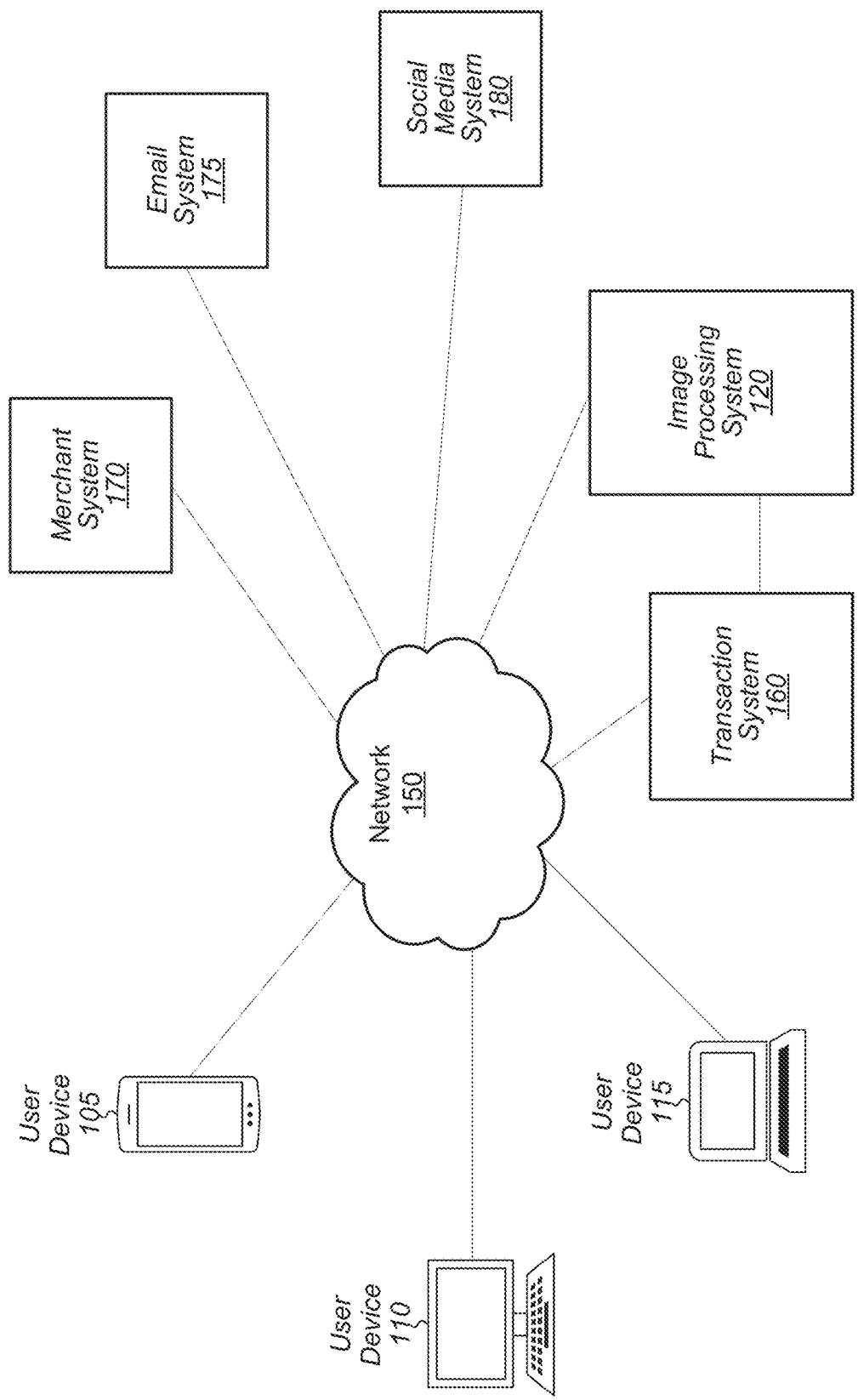
FIG. 1 illustrates a block diagram of a system that includes users devices, an image processing system, a transaction system, a network, a merchant system, email system, and social media system, according to some embodiments.

The present specification allows for the embedding of digital tokens, including digital incentive tokens, within a digital image. These tokens may be cryptographically encoded using an encryption key, such as a public key of a public/private key pair. An encrypted digital token may therefore be embedded within a digital image, in various embodiments, including a variety of encrypted information.

By embedding a digital token within an image, the image may be sent to one or more users along with the token. A recipient of the image may not only be able to view the image, but can take additional action or gain additional functionality from the digital token that is embedded within the image.

Tokens can be embedded by altering image metadata in some embodiments. Metadata may be altered so that the image itself is not changed, but associated data with the image is changed to reflect a created token. In other embodiments, pixel data of the image itself can be modified to reflect a created token. For example, individual pixel values, such as red/green/blue color values, can be altered using one or more algorithms so that a digital token is embedded partially or fully within the image itself. This may be advantageous in some cases where an image may be shared on a different platform that may strip some or all metadata from an image—by embedding the token within the pixel values themselves, the token cannot (or cannot easily) be stripped from the image. In yet further embodiments, an image can be embedded in a token such that the resulting image is noticeably visually altered. For example, a filter could be put on the image (black/white, sharpening, softening, color-altering, or any of a number of visual image filters). A token embedded within the image could be embedded within pixel data that was changed as a result of the filtering, e.g., the filter itself could be used to mask embedded token data in the image. This could be integrated with social media platforms in some embodiments, e.g., an image could be uploaded to a site and/or transmitted to a particular user via an application on a smartphone where the filtering process is used in association with creating and embedding a digital token.

Digital incentive tokens, in various embodiments, can include coupons or other promotional offers for a user. The present disclosure includes novel digital mechanisms for the creation, use, and delivery of digital incentive tokens.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of a system 100 is shown. In this diagram, system 100 includes user device 105, 110, 115, an image processing system 120, a transaction system 160, a network 150, a merchant system 170, an email system 175, and a social media system 180. As discussed below, various systems in this figure may interact with one another to create digital incentives, embed the digital incentives in images, transmit images including the digital incentives, and allow redemption of the embedding digital incentives. Note that in various embodiments the digital incentives may be tokenized and/or encrypted, which can allow for more granular control over the digital incentives. Tokenization, as discussed below, includes creating a unique reference number for a digital incentive that may require validation by a particular party for redemption or other action.

User devices 105, 110, and 115 may be any type of computing system. Thus, these devices can be a smartphone, laptop computer, desktop computer, tablet computer, etc. Some user devices may have a digital camera integrated into them, such as a smartphone for example.

Image processing system 120 may comprise one or more computing devices each having a processor and a memory, as may transaction system 160. In various embodiments, image processing system 120 can take various operations related to embedding digital incentives, including digital incentive tokens, within digital images. Transaction system 160 may correspond to an electronic payment service or other service such as provided by PayPal™. Thus, transaction system 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account.

Transaction system 160 may be used to create digital incentive tokens, in various embodiments. In some instances, image processing system 120 may be utilized to alter an image to include a digital incentive, according to techniques described herein. In various embodiments, however, either or both of transaction system 160 and image processing system 120 may be used to effect any of the various operations described relative to digital incentives, including digital incentive tokens.

Merchant system 170, in various embodiments, corresponds to a seller of goods and/or services. Merchant system 170 can therefore include a web server that is configured to provide electronic commerce (e-commerce) shopping options to consumers. In various instances, merchant system 170 may create a digital incentive or contact transaction system 160 to request creation of a digital incentive. Digital incentives may be transmitted to a user via merchant system 170 in various instances (e.g. merchant system 170 can email a digital incentive, transmit a digital incentive via a website, send a text message (e.g. SMS) containing a digital incentive to a phone number of a user, etc.).

Email system 175 and social media system 180 can also be used to transmit digital incentives and/or request their creation. Note generally, that creation of a digital incentive as discussed herein may include use of an image into which a digital incentive, which may be a digital incentive token, can be embedded. Creation of a digital incentive therefore can include selection of a particular image for the digital incentive. Email system 175 can correspond to a web email service such as GOOGLE MAIL™, or to another email service run by any party (merchant, owner of transaction system 160, etc.). Social media system 180 corresponds to different social media services in various embodiments, such as TWITTER™, FACEBOOK™, or any other such platform. Social media system 180 can be used to create digital incentives and/or to deliver digital incentives to users (e.g. via direct message, public or semi-private posting (e.g. FACEBOOK™ wall post or TWITTER™ tweet, etc.).

Figure 2A:
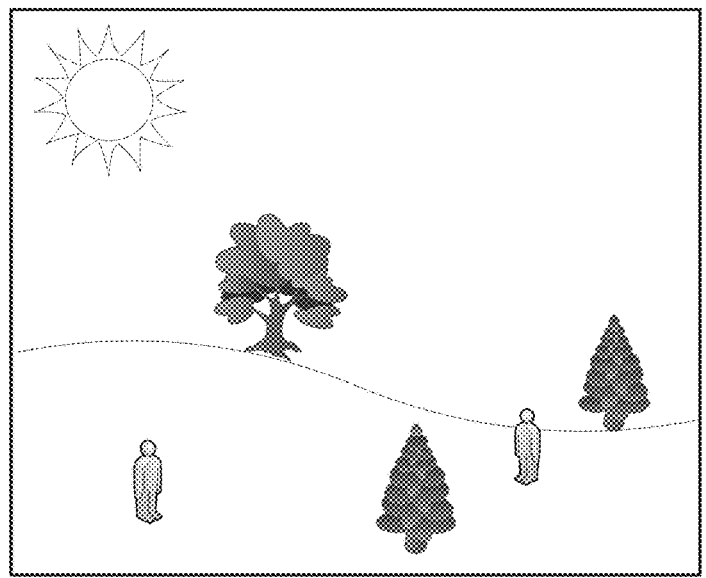
FIGS. 2A and 2B illustrate block diagrams of a digital image and a logical representation of an image file, according to some embodiments.

Turning to FIG. 2A, a block diagram 200 is shown of one embodiment of a digital image 210. Digital image 210 depicts any possible scene, and may be generated by a user of a smartphone or digital camera. Images such as digital image 210 may also be scanned copies of an analog image (e.g. an image printed from film, a scan of a drawing, etc.). Digital image 210 may also be generated wholly or partially from scratch by a user, with an editing program such as Adobe™ Photoshop. Digital image 210 can also be a screen capture from a video. In other words, digital image 210 can depict anything in various embodiments.

Figure 2B:
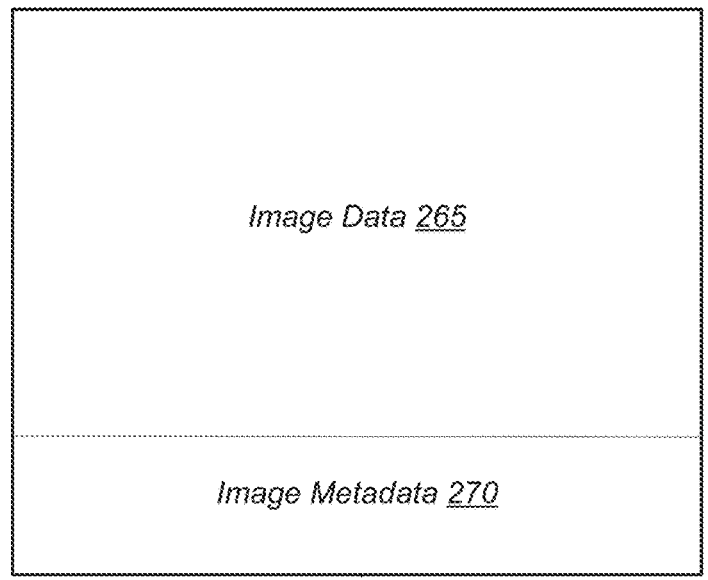

Turning to FIG. 2B, a block diagram 250 is shown of one embodiment of a logical representation of an image file 260. Image file 260 may correspond to any of a number of different digital image formats, such as JPEG, GIF, TIFF, PNG, BMP, RAW, PDF, etc.

As depicted, image file 260 includes a section with image data 265 and a section with image metadata 270. Image data 265 includes various information about the actual visual content of an image. Thus, image data 265 may include information usable to determine red, green, and blue (RGB) color values for each pixel within a digital image, for example.

Image metadata 270 can include various image-related data that is not necessarily needed to be able to render a digital image on a display or printer. Image metadata 270 may contain GPS coordinates or other location information corresponding to a place associated with an image (e.g. a real world location where a picture was taken). Image metadata 270 may include a date and/or time that a picture was taken. Image metadata 270 can also include other data in various embodiments—for example, identities of people in the image, as may correspond to social media websites such as Facebook™. Image metadata can include a creator of the image, which could be a merchant or other party who intends to use the image to embed a digital incentive, and could be used to specify other information as well—for example, any restrictions on a digital incentive token (which could be encrypted and/or stored by a system not fully accessible to a user such as transaction system 160), can also be specified unencrypted within metadata of an image.

Note that while depicted to be logically separate in FIG. 2B, image data 265 and image metadata 270 could be co-mingled within a file in various embodiments. That is, image data 265 and image metadata 270 need not be separate and contiguous in storage space—this data can be organized in any suitable way that is desired and/or that conforms to a digital image format. In some embodiments, image metadata 270 may even be stored in a separate file or other data construct from image data 265.

Figure 3:
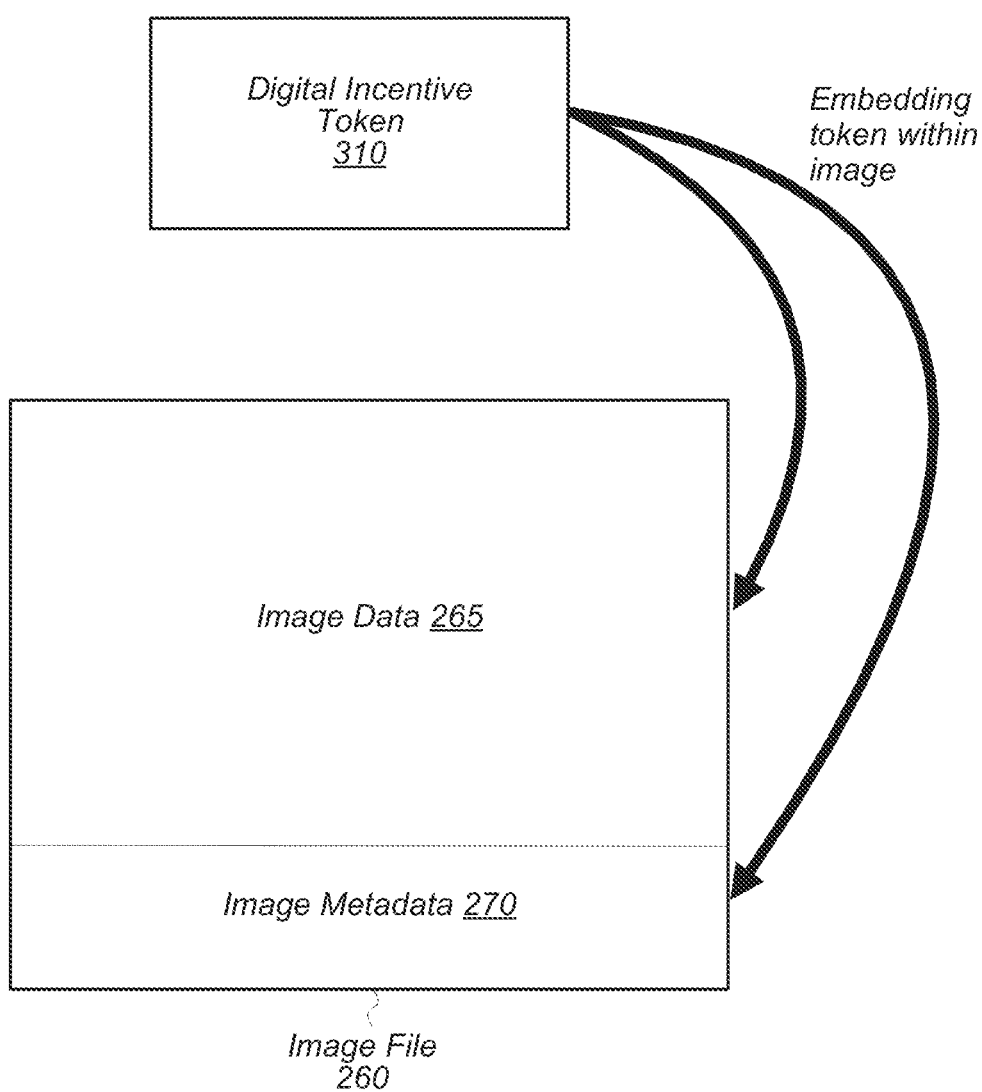
FIG. 3 illustrates an information flow diagram relating to an illustration of one embodiment of embedding a digital token within an image file, according to some embodiments.

Turning now to FIG. 3, a block diagram 300 is shown illustrating one embodiment of embedding a digital token 310 within image file 260. In various embodiments, digital token 310 includes information identifying an amount of digital currency. This information may take a variety of formats, but in some embodiments, includes an identifier unique to image processing system 120 and/or transaction system 160. However, in some embodiments digital token 310 may also be a digital incentive token as discussed further below—and thus, digital incentives may be tokenized and embedded within an image.

When digital token 310 is embedded within image file 260, the digital token may be stored partly or wholly within image data (e.g. using steganographic techniques) or partly or wholly stored within metadata associated with an image. These aspects are discussed further below.

Figure 4:
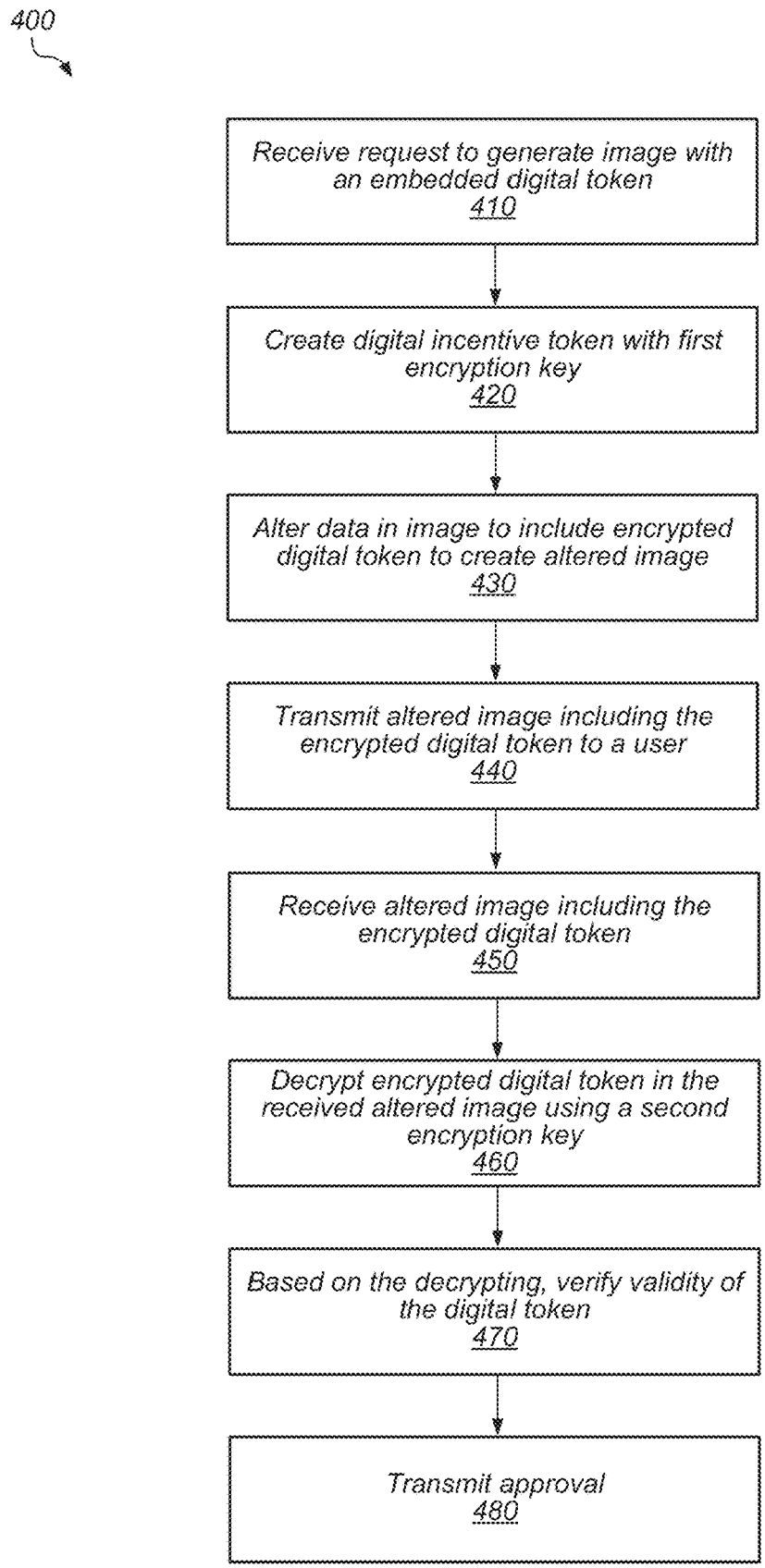
FIG. 4 illustrates a flow diagram of a method that relates to creating and embedding a digital incentive token in an image, according to some embodiments.

Turning now to FIG. 4, a flow diagram is shown illustrating one embodiment of a method 400 that relates to generating an image with an embedded digital token, which may be a digital incentive token in various embodiments.

Operations described relative to FIG. 4 may be performed, in various embodiments, by any suitable computer system and/or combination of computer systems, including image processing system 120, transaction system 160, merchant system 170, email system 175, and/or social media system 180. For convenience and ease of explanation, however, operations described below will simply be discussed relative to image processing system 120. Further, various elements of operations discussed below may be modified, omitted, and/or used in a different manner or different order than that listed as an example.

In operation 410, in one embodiment, image processing system 120 receives a request from a first user of a first computer system to generate an image with an embedded digital token. This request may be received from merchant system 170, email system 175, social media system 180, one of user devices 105, 110, or 115, or any other system, for example. The request may be received immediately preceding the creation of a digital incentive token, or may be received some substantial amount of time beforehand (e.g., a general request to create a variety of digital incentive tokens could be sent beforehand, and therefore, one request can authorize advance creation of numerous tokens, e.g., for a marketing campaign).

The embedded digital token is a digital incentive token, in various embodiments, corresponding to a potential future transaction for a good or service. In some embodiments, a user can select the image in which he or she wishes to embed a digital incentive token. For example, a merchant might use an image of a good or service that it wishes to discount via the digital incentive. A picture of a motorboat, for example, could have an embedded digital incentive token for $1000 off the boat. Likewise, a picture of a well-manicured yard would have a digital incentive token for 25% off lawn mowing services. The source image for embedding can be of any of a variety of formats, and also need not be a real-world scene (computer-generated graphics, hand drawn graphics, images from a video game, etc. may all be used).

The request to create a digital incentive token may be accompanied by an image for the token, with the image being provided by the requestor. In other instances, the image could be selected from available images maintained by image processing system 120 (or another system). In yet further embodiments, an image could be automatically selected by image processing system 120. For example, if a digital incentive was created for EBAY.COM™ online auction listing, the first (primary) image for the auction listing could be automatically downloaded from the web page by image processing system 120 and used for embedding the digital incentive.

Note that a merchant or other party may wish to exercise discretion in picking an image into which a digital incentive token is embedded. Images that are undesirable (e.g. violence, pornography, incorrect product, competitor's product, etc.) will therefore be avoided by merchants or other users in various embodiments. As discussed below, digital incentive token security features can also tie a digital incentive to a particular image such that the token cannot be simply transplanted to another image (in the case of a malicious actor, for example). A seller of high-end chocolate ice cream, for example, may not want a malicious actor to be able to embed an authorized digital incentive from a picture of ice cream into an unauthorized image of a picture of a pile of mud.

In operation 420, image processing system 120 creates a digital incentive token encrypted with a first encryption key. This digital incentive token may include a variety information specific to a potential future transaction. Thus, a digital incentive token includes parameter data specifying one or more parameters of the digital incentive in various embodiments. In some instances, the parameter data may be stored within the token itself, however, in other embodiments some or all parameter data may be stored at a central location (e.g. a database maintained by image processing system 120).

Parameter information for a digital incentive token can include virtually anything related to the digital incentive. Restrictions can be set on the digital incentive, such as expiration date and/or time, recurring periods of validity (e.g. only between certain hours on certain days and/or months), and one or more persons for whom the incentive can be redeemed. Individuals may be specified by any number of identification credentials, including phone numbers, email addresses, electronic payment transaction account (e.g. such as a service provided by PayPal™) or other information. For example, a redeemer of the digital incentive may have to verify her identity by logging into a PayPal™ account, clicking on a verification link sent via email, entering a one-time password sent via text message, etc.

Other parameter information for the digital incentive may include restrictions on the goods or services to which the incentive applies. For example, the incentive may apply to all goods made by a particular manufacturer, or only certain goods or certain categories of goods. Parameter data may also set one or more geographic restrictions in the incentive. The incentive might be usable in only certain countries, states, cities, or time zones.

In some instances, a digital incentive may require the incentive to be shared with one or more other users in order to unlock one or more features of the digital incentive. For example, and incentive might not be redeemable unless it was shared with a specific number of other users, or a step-up incentive might be offered (e.g. 10% off an item or 20% off if you share the offer with 3 friends). Sharing can be accomplished by sending the image through any communication mechanism, such as email, text message, or social media. In some instances, digital incentives may have specified numbers of uses allowed—for example, only the first 5 users of a particular image having an embedded token might be able to redeem an incentive. Thus, someone could share an image on Facebook™ or another social media platform and other users might be motivated to use the digital incentive quickly, fearing they might miss out on a deal.

Verifying that an image has been shared, in some cases, requires access to a device or account of a recipient. An app on a user's mobile phone device could verify that a user has viewed an image with an embedded digital incentive token, for example. An interface with software of any service provider can be used to verify sharing. If a social media site such as Facebook™ or Twitter™ for example has programmed a web interface or other application accordingly, those platforms may be able to verify that a user has received and/or reviewed an image containing an embedded digital incentive. Further, image processing system 120 may also be able to observe whether another user has redeemed a shared digital incentive, and authorize additional or step-up incentives accordingly. (Note, again, that any operations described relative to image processing system 120 can be performed by transaction system 160 in various embodiments, and in one or more embodiments, image processing system 120 may be combined with transaction system 160 as one or more networked computing devices).

Information identifying a digital incentive token, in some embodiments, can include a unique identifier created by image processing system 120. Image processing system 120 may maintain information for a large number of different images with embedded digital tokens, including digital incentive tokens, each of which may be redeemable for one or more offers relating to a potential future transaction. In order to be able to track the digital tokens (and to know whether they have been used, etc.), image processing system 120 therefore can use unique IDs for each token to access information associated with that token (e.g., creator of token, parameter information for the digital incentive, etc.). Note that various attribute information/metadata may be associated with a digital token that is embedded in an image. This information can be included at the time the digital token is created, or can be modified at a later time in some embodiments.

The encrypting performed in operation 420 may be done using a public-private key pair. In one embodiment, for example, operation 420 may include image processing system 120 encrypting a digital token (including a unique ID) with the public key in a public-private key pair (preventing the encrypted digital token from being decrypted by someone who does not have the corresponding private key, which may be kept secret by image processing system 120). In another embodiment, operation 420 may also include using the private key of a public-private key pair to add signature information into an image. For example, a private key for PayPal™ could be used to encrypt information saying "This image includes a $5.00 discount on any purchase over $25 from a merchant who accepts PayPal™ for payment!" (or similar). Anyone with PayPal's public key could decrypt the signature information and would then know that PayPal authorized placement of a digital incentive token within an image, in this example. In some cases, a merchant or other party could also use its own key to encrypt the digital token.

A merchant or other party could also co-sign (with a private encryption key) a digital incentive token so that a user could see that both the merchant, as well as an electronic service provider such as PayPal™ have authorized the incentive. For example, merchant system 170 could send a request to image processing system 120 to create a digital incentive token for an image, with the request including signed specifications for the incentive (discount amount, expiration date, any other parameter information). An electronic service provider such as PayPal™ could then create the token and embed it in an image along with the merchant's signed specifications. An end user could therefore see and verify (with the public keys for the merchant and PayPal™) that both of the other parties are guaranteeing the incentive.

Operation 430, in some embodiments, includes altering data in an image to include an encrypted digital incentive token in order to create an altered image that includes the encrypted digital incentive token. In other words, an encrypted digital incentive token may be stored within an altered image. Operation 430 includes altering image metadata 270 and/or image data 265 in various embodiments. Altering data in an image to include an encrypted digital incentive token therefore can be performed in different manners. In some cases, altering image metadata 270 may result in a completely unchanged digital image. In other cases, altering image data 265 can result in a changed digital image—however, these changes may be very slight such that a user's visual perception of the altered digital image is similar or the same to their perception of the un-altered image prior to embedding of the encrypted digital token. Altering data in the image therefore can include altering metadata and/or altering image data.

In operation 440, in one embodiment, image processing system 120 transmits an altered image (e.g. from operation 430) that includes an encrypted digital incentive token to a first user. The transmitting in operation 440 can therefore include a transmission to a device and/or a user account. Transmitting can be accomplished by an upload to a social media platform (e.g., a direct message on TWITTER™, an image posted on INSTAGRAM™ or FACEBOOK™, etc.). Transmitting in operation 440 can include sending an email to a user email address, or a multimedia text message directed to a phone number (e.g. an MMS message) which may ultimately be received by a smartphone, for example, in various embodiments. An image with an encrypted digital incentive token, once initially created and/or transmitted, can also be shared without restriction in various embodiments (e.g. a first user can send the image to a different second user, who can then send the image on to anyone of their choosing). Note that in various cases, however, while an image with an embedded digital incentive token may be shared freely, restrictions on redemption may still apply.

In one embodiment, operation 440 includes using a closed system to transmit an altered image with an embedded digital token. A user of PayPal™ (or another platform) for example, might be allowed to transmit an altered image with a digital incentive token to other PayPal users, or to users of one or more other particular platforms. E.g., image transmission may be restricted in some instances. For example, a client platform application might allow a user to view a photo and transmit the photo, but only within the platform application. If the user tried to capture the image with a screen shot, in one embodiment, the embedded digital token data would not carry forward with the captured image. Thus a user can be prevented from unrestricted transmission in some cases.

In operation 450, in one embodiment, image processing system 120 receives the altered image including an encrypted digital incentive token. The altered image may be received responsive to a user action, and may be received from a first user (e.g. a user to which the image was originally transmitted) or any other user, in various embodiments. Thus, an image created with an embedded digital incentive token can be sent to one or more various users, and then subsequently received at image processing system 120. After this later receipt, image processing system 120 can determine if there is a valid token can should be redeemed for currency, as further discussed below.

Image processing system 120 can receive an image in a variety of ways in operation 450. In some embodiments, a website checkout page may have a button or other input mechanism for a user to upload or "paste" an image containing an embedded digital incentive token in association with a purchase. (The token-containing image can be inserted into the purchasing flow at any stage, however, not just checking.)

In some cases, an image containing an embedded digital incentive token can be stored in a repository such that the user does not have to take manual action to use the incentive. A user who has received and viewed an image could have the token saved in association with an account, for example. Thus, a PayPal™ user who has viewed a token-containing image within the PayPal phone app can have the token associated with their account (e.g. in a database accessible to transaction system 160). Then if the user is logged into their PayPal account during a web browsing session/transaction flow, the incentive can automatically be applied for a purchase. The incentive may still be subjected to eligibility checks at the time of purchase (expiration date and other restrictions) in various such embodiments.

Operation 460, in one embodiment, includes decrypting, by image processing system 120, an encrypted digital incentive token in an altered image. As noted above, the altered image can be transmitted to image processing system 120 by any user in possession of the altered image, in various embodiments, for decryption (or can be accessed via a stored library after the. Operation 460 therefore can include using a second encryption key (such as a private encryption key in a public-private key pair) corresponding to a first encryption key (e.g. the public key) in order to perform decryption. After decryption, the embedded digital token can then be checked for validity and/or redeemed for currency, for example.

In some instances, operation 460 may require that image processing system 120 be able to first extract the data from an altered image that should correspond to the embedded digital incentive token. In other words, image processing system 120 may need to know which bits of an image should be run through a decryption operation. This can be accomplished in some embodiments as long as image processing system 120 knows what algorithm(s) and/or data were used to alter the image originally. E.g., image processing system may know to look at certain pixel values to extract one or more bits of information, or which portion(s) of image metadata contain embedded digital token data. Image processing system 210 may have to reassemble an embedded digital token data prior to decryption (e.g. by appending different bits of extracted information and/or taking other operations, such as using bitwise arithmetic like addition, subtraction, or multiplication on certain bits of extracted information).

In operation 470, in one embodiment, image processing system 120 verifies the validity of a decrypted digital incentive token (e.g. from operation 460). Verifying validity can include extracting a unique identifier from the decrypted digital token, and then querying a database with the unique identifier. The database may include a list of all digital incentive tokens created by image processing system 120, and a record for the unique identifier can be referenced in the database. This record can contain an indicator of whether or not a given token is valid or invalid, for example. The token may be marked invalid, for example, if it has already been redeemed by a user. If there is no record for a unique token identifier, in some embodiments, this may indicate that the corresponding token is not currently valid (e.g. so that expired digital incentives do not necessarily have to be tracked by the database). Note that in some cases, it is possible that a decryption operation on the token, e.g. in operation 460, can fail on its own, which may indicate that an image has no valid encrypted digital token in various embodiments. This could occur if an image with a digital token became corrupted due to data errors or user interference, for example.

After a digital incentive token from an image is verified, a user who wishes to use the digital incentive token in a transaction may be credited with a discount, free item, or other incentive as specified by the digital incentives. Redeeming the incentive could include receiving a credit to a PayPal™ account balance, being emailed an electronic gift card, or take any other number of forms.

In some cases, image processing system 120 may be notified when a digital incentive token from is used. For example, image processing system 120 may verify validity of a token, but the user might not complete a purchase. In this case, the token would not actually be used. Thus, a merchant or other party can notify image processing system 120 when a purchase using a token has been completed so that a database for digital incentive tokens can be modified accordingly. (Again, as noted above, in some cases digital incentives may be used more than once, and thus a token may have a lifespan longer than a single use.)

Operation 470 may also include checking to see if an incentive specified by a digital incentive token is valid based on parameter information (which may be stored in a database). The parameter information can be examined to see if the digital incentive is valid to redeem based on whether user identity requirements, purchase requirements, expiration dates, etc., have been met. If any requirements are not met, the user can optionally be informed the reason that the token cannot be redeemed.

In operation 480, in one embodiment, image processing system 120 transmits an incentive approval acknowledging the validity of a digital incentive token and that parameter information requirements have been met. In various embodiments, operation 480 is performed responsive to verifying the validity of a digital token (e.g. operation 470). In some cases, however, operation 480 may simply include partial verification of parameter requirements, while a merchant or other party may be tasked with verifying additional requirements. For example, an electronic service provider such as PayPal™ might indicate that a digital incentive token has not expired, and could specify one or more goods or services eligible for purchase using the underlying digital incentive. It might be the responsibility of a merchant, however, to ensure that an item in a user's online shopping cart is, in fact, an item covered by the digital incentive.

Operation 480 may relate to sending an email, text message, or other communication that informs a user, merchant, and/or other party that an image (e.g. that has been uploaded back to image processing system 120) contains a valid incentive digital token. This acknowledgement may include information about the parameters of the digital incentive (e.g. an amount of discount, etc.) As will be appreciated, information about the successful validation of a digital incentive token embedded in an image can be communicated in a variety of ways.

In some cases, a user may attempt to redeem a digital incentive token in association with an image that was not the original (altered) image in which the digital incentive token was included. For example, a prankster might attempt to extract the digital incentive token data from one image, and put the token data into an offensive image instead. In addition to verifying token information (and parameter information for the incentive), image integrity checks can also be run on the image submitted by user who wishes to redeem an incentive.

Image integrity checks can include sampling, at the time of creating of the altered image, various areas of the image for color values, etc. For example, 16 pixel regions in several different part of the image might be color-sampled, averaged, and stored in a digital incentive token database. Thus, region 1 might have an average RGB value of [12, 250, 125] (on a 256 bit scale), while region 2 might have average RGB values of [64, 30, 190]. When determining if a digital incentive can be redeemed, the submitted image can be checked to see if these regions are identical to that which was sampled earlier (or within a particular allowable range such as plus or minus 5%, 10%, or 20%, 5 or 10 points on a 256 bit scale, etc.). If the uploaded image does not match the original altered image, use of the digital incentive token can be denied. This can prevent a user from tampering with an offer by a merchant to cause the merchant embarrassment, for example.

Other methods of image integrity checking can also be performed besides color value sampling. Dimensions/proportionality of the image can be checked. A digital hash value can be taken from the image file itself and stored in the database, where any change at all would a different hash value to appear on attempted redemption—if the current hash did not match the old hash at the time the digital incentive token was embedded, the redemption of the incentive could be denied.

Thus, in some cases, a database entry for a digital incentive token may include image integrity information enabling checking of the image when a user tries to redeem a token. A merchant or other party may also specify whether or not they want a particular incentive to have image integrity restrictions (for example, some users may not care whether a digital incentive token is extracted from a first source image and placed into a second, different source image).

Geo-Location Data & Additional Aspects

Geo-location data can be used in a variety of ways with digital token-containing images in various embodiments. Geo-location data for an image can be used to determine whether a user is allowed to redeem an encrypted digital incentive in some embodiments. For example, a user may have to position themselves in a geographic location of where an image was taken in order to redeem a digital incentive token embedded in the image (or a user may have to position themselves in another geographic location as specified). This can be enabled by images with embedded tokens having GPS location tagging information, in various embodiments.

Additionally, note that a merchant or other party can specify geo-fencing location data for redemption of a digital incentive token in a variety of ways. In some embodiments, a user can take an image of a real world location, and tie redemption of the image to a physical presence (e.g. as detected by a GPS device) in that real world location. In another embodiment, a user can assign one or more arbitrary physical locations for redemption of an image, or one or more arbitrary categories of location. For example, a merchant or other party could take a picture of a particular location of one of their restaurants, and specify that a digital incentive token in the image could be redeemed by anyone who is located within 100 feet of that restaurant. A merchant or other party can even acquire a picture of anything (from an outside source, or from his own camera) and allow a digital token for that image to be redeemed in any arbitrary specified location. (Note that as described herein, various actions described as being taken by a merchant can be taken by any other party as well, e.g., use of the present technology is not restricted to parties that might only be thought of traditionally as a merchant or a consumer.)

In another aspect, the way in which pixel image data is altered to include a digital incentive token may be based on one or more algorithms that use different underlying situational data. For example, a time of day can be used as a basis for determining which particular data in an image is to be altered. This may especially apply, in some embodiments, when data is being stored by altering pixel data (e.g. as opposed to altering only metadata). Image processing system 120 can use a timestamp (date and time, for example) to determine which particular pixel values might be altered. Thus, if image processing system 120 receives an image at a first date and time, the pixels [0, 20], [15, 30], and [250, 17] might be altered (among others) to store digital token data. At a different date and time, pixels [5, 10], [33, 50], and [100, 575] (among others) could be altered. Image processing system 120 may keep a record in a database of the timestamp so that when the altered image is later presented for validation and redemption, the system can know where to look to find the embedded digital token data. In various embodiments, this feature may enhance security by making it more difficult for a party other than image processing system 120 to extract a digital token. Another algorithm may similarly alter pixel data based on GPS location coordinates associated with the image (e.g. a mapping or hashing function can be used to determine which particular pixels to alter based on the input data).

Digital Token Controls

In some cases, a digital incentive token embedded in an image may have various controls associated with it. As discussed elsewhere herein, a digital incentive token sometimes can only be redeemable within a geo-fenced area in the real world (e.g. as detected by the presence of a user's physical device through GPS or other means of detecting location).

A digital token may also have time-based controls. In some cases, a digital token might only be redeemable at certain times of day, days of the week, specified dates, etc. Digital tokens can also have expiration dates associated with them. Thus, if a recipient gets an image with an embedded digital token, that token could be specified to expire within two weeks (or by a certain date, etc.).

Recipients who are allowed to redeem a digital token embedded in an image can also be controlled, in some embodiments. In some instances, a user may wish to restrict an embedded digital token to certain individuals or groups so that only those individuals or groups are allowed to redeem the token. Thus, when a merchant or other party requests to create an image with an embedded digital token is made, the merchant may specify one or more options restriction redemption of the digital token.

A merchant or other party can specify individuals who are allowed to redeem a token by email address, by network identifier (e.g. social media user ID), phone number, or other identifying information. A user can also specific groups based on one or more characteristics. These characteristics can include email address domain, e.g., anyone with a RICE.EDU email address, a residence, e.g., anyone who has a postal mailing address in the city of San Jose, Calif., anyone who is connected on social media (e.g., a "friend" on Facebook™) or even anyone within a degree of connection (e.g., friends of friends on Facebook™, first, second, or third degree connections on LinkedIn™, etc.). Various other group-defining characteristics are possible. In some cases, information on whether a recipient is allowed to redeem a digital token can be gathered from an online service and/or website that a user is associated with (e.g., a home address associated with a PayPal™ account might be used for purposes of determining residence city, state, and country).

Computer-Readable Medium

Figure 5:
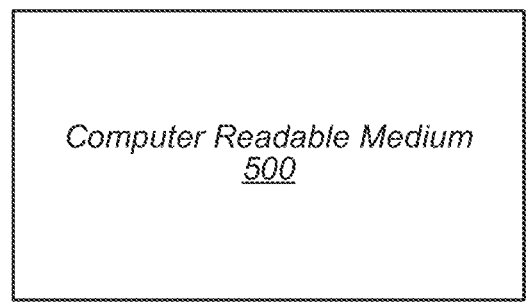
FIG. 5 is a block diagram of a computer readable medium, according to some embodiments.

Turning to FIG. 5, a block diagram of one embodiment of a computer-readable medium 500 is shown. This computer-readable medium may store instructions corresponding to the operations of FIG. 4 and/or any techniques described herein. Thus, in one embodiment, instructions corresponding to image processing system 120 may be stored on computer-readable medium 500.

Additional aspects of computer-readable medium 500, and operations it enables in various embodiments, are described below. Note that these some or all of these aspects are combinable with aspects described elsewhere in this disclosure (E.g. details described for method 400 may apply to computer-readable medium 500, and vice-versa). For brevity, with respect to FIG. 5, the term "operations" will be used to refer to operations caused by execution of instructions stored on computer-readable medium 500 in various embodiments.

In one aspect, operations include altering data of a digital image such that data is inserted into a metadata section of the digital image. Thus, a unique identifier of a digital token can be stored in metadata of an image (and may be encrypted in some instances). Altering data of a digital image to store a digital token can also include generating pixel values by changing a plurality of pixel values in the image. Thus, image processing system 120 may operate under an algorithm, which may be image specific, such that a red pixel value at [0, 20] greater than 128 on a 256 bit scale is considered a "1" while a value less than or equal to 128 is a "0"). A green pixel value for the same [0, 20] pixel might be greater than 32 to be considered a "1", and otherwise considered "0". In some instances, storing the digital token within image data may therefore include tweaking image data (for example, adjust a green pixel value from 30 on a 256 bit scale to 32, which might change its value to "1" when image processing system 120 extracts token data from the image). Accordingly, making changes to image pixel data may include changing pixel values within a particular corresponding range to avoid a significant negative impact on image quality (e.g. constraining value changes to within an absolute quantity such as 3 or 5 points on a 256 bit scale, or a percentage quantity such as 1%, 2%, 2.5%, or some other value). In some instances, there may also be a distance requirement between changed pixels (e.g. no two changed pixels should be within a certain distance of one another in the image) to also help maintain image quality.

Embedding a Digital Token without Changing Pixel Data

Note that in some embodiments, pixel data can be used to effectively store a digital token within an image even without having to alter pixel data for the image (or any data, in some instances). Consider a unique digital token identifier value of "123789". This token value can be broken down into six different values (1, 2, 3, 7, 8, and 9). For this pixel value to be effectively stored in an image, image processing system 120 would simply need to locate data within the image that corresponds to each of these six values. As there is often a large amount of pixel data associated with images, this may be fairly easy to accomplish. Image processing server 120 can scan the image file, and look for a pixel that has a value of 1 at a particular location (e.g., perhaps pixel [25, 25] has a blue color value of 1). Image processing server then makes note that for this image, the first value of the digital token identifier can be located at [25, 25] (blue pixel). This process can be repeated such that each component value of a unique digital token value can be found to already exist throughout an image—it may simply be a matter of knowing where to look. Various additional techniques can be used as well—for example, arithmetic could be performed to find the proper transformation. E.g., if the value "1" cannot be found in pixel data for an image, perhaps the value "2" can be found at [10, 5] (red pixel)—and then image processing system 120 would note that for this image, the first component value of the digital token identifier is the value achieved from subtracting one from [10, 5] (red pixel). Many different variations of arithmetic or other transforms are possible. Image processing server 120, upon receiving a digital image from a user in which to embed a digital token representing currency, could then determine (1) a unique identifier for the digital token and then (2) based on analysis of image pixel data, determine where in the image (and what transformations, if any) this unique identifier is already represented, resulting in mapping data (which can include transformation data). Mapping data could then be stored by image processing system 120 for the image in association with a unique hash value (or other key value) for that image.

Upon later getting that image from a user attempting to redeem a digital token, the unique hash value could be determined, allowing a lookup into a mapping database. If an entry is found, the mapping information can then be used to determine a unique digital token identifier. Alternatively, the unique hash value alone could be considered to be the digital token identifier, and used accordingly. Thus, in some instances, it may not be necessary to modify pixel data for an image in order to effectively store a digital token within the image.

In yet another aspect, operations may comprise receiving an upload of a digital image from a merchant or other party and analyzing the digital image to determine if the digital image is considered suitable for alteration to include a digital token. Different standards may be applied in various embodiments to determine if an image is considered suitable. Images that are too small or too large, for example, may be disallowed (e.g. if a user tries to upload a 50×80 image or a 4000×6000 image in which to embed a digital token, these may be rejected, in some instances). Content filters may also be applied. If analysis of an image determines that the image contains nudity, violence, profanity (either visual or textual), and/or copyrighted material, the image could also be rejected in various embodiments.

Social Media and Image-Embedded Digital Tokens

Images with embedded tokens (e.g. images that have been altered to include data representing a digital token or images that have had data sampled and stored of a hash of the image itself, or another way to uniquely identify the image in association with a digital token) can be shared on various social media platforms in different embodiments. A user requesting creation of a digital token n for an image can receive an image that allows the requesting user to post the image on a platform such as Instagram™, FaceBook™, or any other social media service. Another user(s) on these services can redeem a posted image for currency or another reward. Other users on these services can also transmit a posted image to yet further users, particularly in some embodiments where an image can be redeemed multiple times. For example, a digital token may be multi-use, such that a first recipient could redeem it once (or possibly more than once, up to a limit). A user of a social media platform for example might be able to both redeem an image for an amount of currency, and then re-post a multi-use digital token embedded image so that other users (such as friends of friends) could also use the digital token.

Thus, in various embodiments, a digital token can be created by image processing system 120 (or another system) that allows for multiple redemption. A token can be created such that it can redeemed four times for a 20% discount on a purchase from a particular website, for example, with only a unique user allowed to redeem it once (values can be adjusted, of course). When a token is created, the creating user (e.g. merchant) can specify other users and/or groups of users who are allowed to redeem—thus, a given token, which may be embedded in a digital image, can be redeemed multiple times but not necessarily by the same user.

Note that generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript. Note that as used herein, the term "computer-readable medium" refers to a non-transitory computer readable medium.

Computer System

Figure 6:
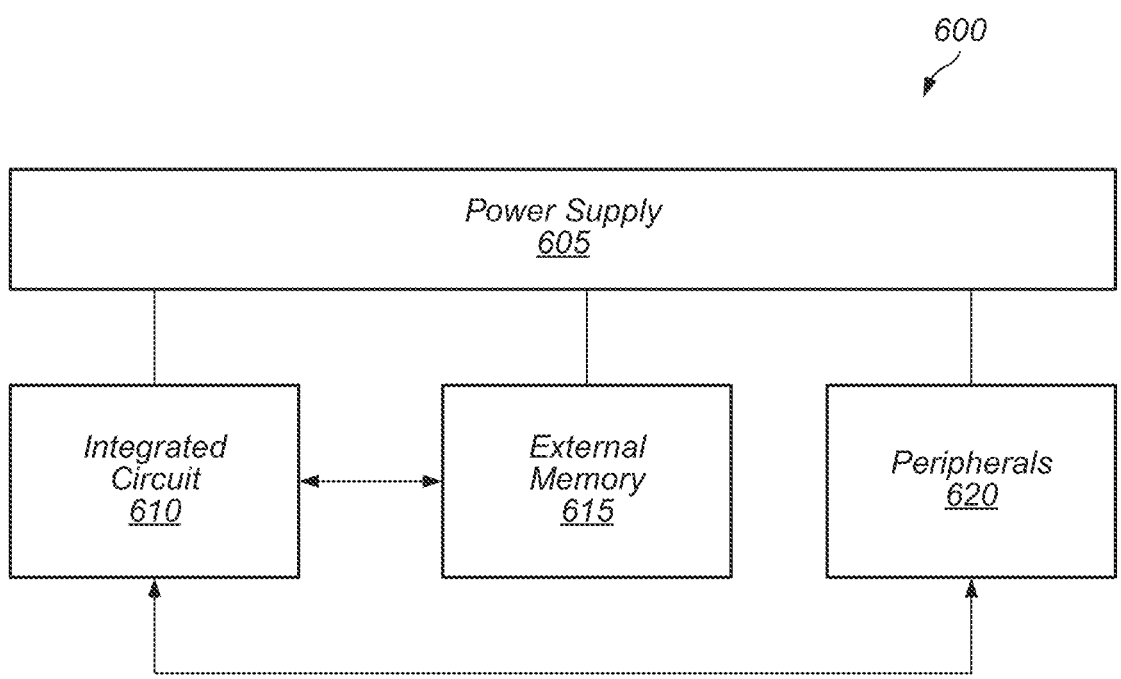
FIG. 6 is a block diagram of a system, according to some embodiments.

In FIG. 6, one embodiment of a computer system 600 is illustrated. Various embodiments of this system may be used for the systems shown in FIG. 1, or any other computer system as discussed above and herein.

In the illustrated embodiment, system 600 includes at least one instance of an integrated circuit (processor) 610 coupled to an external memory 615. The external memory 615 may form a main memory subsystem in one embodiment. The integrated circuit 610 is coupled to one or more peripherals 620 and the external memory 615. A power supply 605 is also provided which supplies one or more supply voltages to the integrated circuit 610 as well as one or more supply voltages to the memory 615 and/or the peripherals 620. In some embodiments, more than one instance of the integrated circuit 610 may be included (and more than one external memory 615 may be included as well).

The memory 615 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 610 in a chip-on-chip configuration, a package-on-package configuration, or a multi-chip module configuration.

The peripherals 620 may include any desired circuitry, depending on the type of system 600. For example, in one embodiment, the system 600 may be a mobile device (e.g. personal digital assistant (PDA), smart phone, etc.) and the peripherals 620 may include devices for various types of wireless communication, such as wifi, Bluetooth, cellular, global positioning system, etc. Peripherals 620 may include one or more network access cards. The peripherals 620 may also include additional storage, including RAM storage, solid state storage, or disk storage. The peripherals 620 may include user interface devices such as a display screen, including touch display screens or multitouch display screens, keyboard or other input devices, microphones, speakers, etc. In other embodiments, the system 600 may be any type of computing system (e.g. desktop personal computer, server, laptop, workstation, net top etc.). Peripherals 620 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

Note that the terms "digital incentive token" or "digital token" are used in various locations in this disclosure relative to embedding tokens in images, and perform related operations. Digital incentive tokens are a type of digital token, and use of the phrase "digital token" explicitly includes digital incentive tokens Further, note that digital tokens are described in various locations as being encrypted, and/or as being embedded in an image. A digital token does not have to be encrypted to be embedded in an image, but encrypting the digital token prior to embedding may enhance security. Additionally, an "encrypted" digital token may refer to a digital token that is wholly or partially encrypted, unless otherwise indicated. Further, as noted above, a digital token can be embedded in an image, in some embodiments, by storing image data (e.g. a hash or other uniquely identifying data) in a central repository (e.g. a database associated with image processing system 120) without any need to actually modify data in the image (such as pixel data or metadata).

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:

altering, by a computer system, an image by embedding a digital incentive token in the image;

determining, by the computer system, a location associated with the altered image;

transmitting, by the computer system, the altered image to a user device associated with an account of a user with a social media platform;

monitoring activities associated with the user account on the social media platform;

after the transmitting, receiving, by the computer system from the user device of the user, a request for processing a payment transaction, wherein the request comprises the altered image;

determining, by the computer system, that a location of the user device corresponds to the location associated with the altered image;

determining a number of user accounts that the user has shared the altered image with using the social media platform based on the monitoring;

in response to determining that the location of the user device corresponds to the location associated with the altered image and the number of user accounts that the user has shared the altered image with exceeds a threshold, extracting, by the computer system, the digital incentive token embedded in the altered image; and applying, by the computer system, an incentive specified by the digital incentive token to the payment transaction.

2. The method of claim 1, further comprising:
in response to applying the incentive to the payment transaction, transmitting an incentive approval notification to a computer server system corresponding to a particular merchant indicated by the incentive.

3. The method of claim 1, wherein the digital incentive token is associated with parameter data specifying one or more parameters of the incentive, wherein the one or more parameters include an expiration date for the incentive, and wherein the method further comprises determining that the request is received prior to the expiration date.

4. The method of claim 1, wherein the digital incentive token is associated with parameter data specifying one or more parameters of the incentive, wherein the one or more parameters comprise a parameter that limits the incentive for use by specified one or more groups of people, and wherein the method further comprises determining that the user is associated with at least one of the one or more groups of people.

5. The method of claim 1, wherein the digital incentive token is associated with parameter data specifying one or more parameters of the incentive, wherein the one or more parameters comprise a parameter that limits the incentive for use in a purchase of specified one or more goods or services, and wherein the method further comprises determining that the payment transaction is associated with purchasing any one of the specified one or more goods or services.

6. The method of claim 1, wherein the digital incentive token is associated with parameter data specifying one or more parameters of the incentive, wherein the one or more parameters include a parameter that limits a number of times that the incentive can be used, and wherein the method further comprises determining that the digital incentive token has not been used for more than the number of times prior to receiving the request.

7. The method of claim 1, wherein the digital incentive token embedded in the altered image is signed by a merchant associated with the incentive using a private encryption key of the merchant.

8. The method of claim 1, wherein the altering the data in the image comprises:
determining a portion of image data in the image to be altered based on a timestamp associated with the image; and
altering the portion of image data to embed the digital incentive token in the image.

9. The method of claim 1, further comprising determining whether the incentive specified by the digital incentive token has previously been redeemed in a second payment transaction.

10. A non-transitory machine-readable medium having stored thereon machine-readable instructions executable to cause a machine to perform operations comprising:
receiving a request for generating a digital coupon associated with an incentive;
creating a digital incentive token that includes information specific to the incentive;
obtaining an image comprising a plurality of pixels;
determining, from the plurality of pixels in the image, a subset of pixels to be altered based on at least one of a time when the image is obtained or a physical location associated with the image;
altering the image by embedding the digital incentive token in the subset of pixels in the image; and
transmitting the altered image to a user device of a user.

11. The non-transitory machine-readable medium of claim 10, wherein the operations further comprise creating a database tracking entry for the digital incentive token.

12. The non-transitory machine-readable medium of claim 10, wherein the altering the image comprises replacing a plurality of pixel values corresponding to the subset of pixels with altered pixel values determined based on the digital incentive token.

13. The non-transitory machine-readable medium of claim 11, wherein the operations further comprise:
receiving a request for redeeming the incentive, wherein the request comprises the digital incentive token; and
in response to receiving the request, altering the database tracking entry to indicate that the digital incentive token has been used.

14. The non-transitory machine-readable medium of claim 10, wherein the operations further comprise:
encrypting the digital incentive token with an encryption key associated with an electronic service provider, wherein the altering the image includes embedding the encrypted digital incentive token in the subset of pixels of the image.

15. A system, comprising:
a non-transitory memory; and
one or more hardware processors coupled to the non-transitory memory and configured to read instructions from the non-transitory memory to cause the system to perform operations comprising:
altering an image by embedding a digital incentive token in the image;
determining a location associated with the altered image;
transmitting the altered image to a user account of a user with a social media platform;
after the transmitting, monitoring activities associated with the user account on the social media platform;
receiving, from a user device of the user, a request for processing a payment transaction, wherein the request comprises the altered image;
determining that a location of the user device corresponds to the location associated with the altered image;
determining a number of other user accounts that the user has shared the altered image with using the social media platform based on the monitoring;
in response to determining that the number of other user accounts that the user has shared the altered image with exceeds a threshold, extracting the digital incentive token embedded in the altered image; and
applying an incentive specified by the digital incentive token to the payment transaction.

16. The system of claim 15, wherein the operations further comprise creating a database tracking entry for the digital incentive token.

17. The system of claim 15, wherein the operations further comprise:
receiving a second request for processing a second payment transaction from a second user device, wherein the second request comprises a second image that includes the digital incentive token;
determining that the second image does not match the altered image in which the digital incentive token was embedded; and
based on the determining that the second image does not match the altered image, transmitting, to the second user device, an indication that the digital incentive token cannot be redeemed.

18. The system of claim 15, wherein the operations further comprise:
- transmitting, to a device corresponding to a merchant associated with the payment transaction, an indication that the incentive has been redeemed by the user.

19. The method of claim 1, wherein the location associated with the altered image is a location represented by a scene depicted in the altered image.

20. The method of claim 1, further comprising:
- receiving a second request for processing a second payment transaction from a second user device, wherein the second request comprises the altered image;
- determining a second number of user accounts that the second user has shared the altered image with using the social media platform;
- in response to determining that the second number of user accounts that the second user has share the altered image with does not exceed the threshold, transmitting, to the second user device, an indication that the digital incentive token cannot be redeemed.

* * * * *